United States Patent Office 2,737,920
Patented Mar. 13, 1956

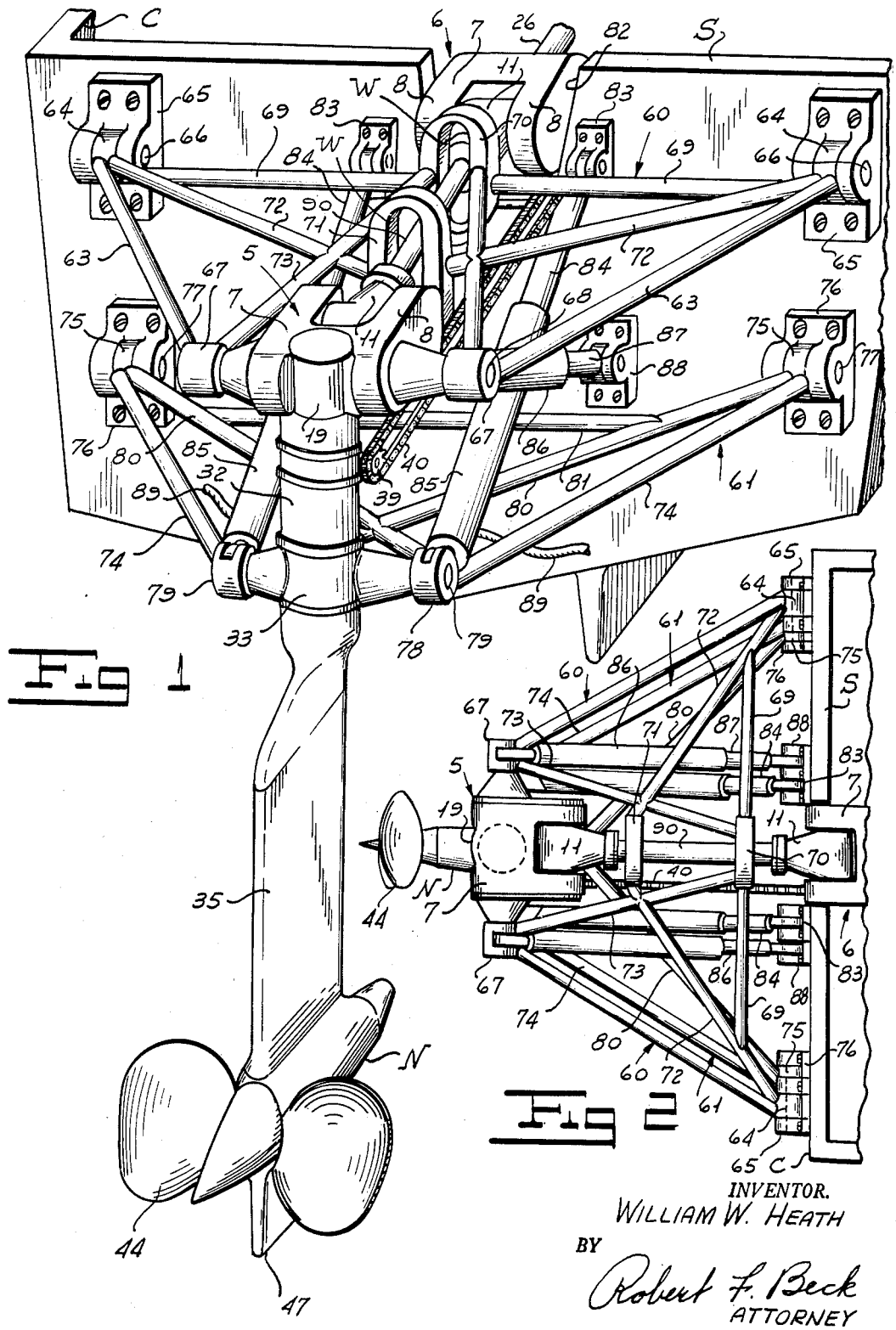

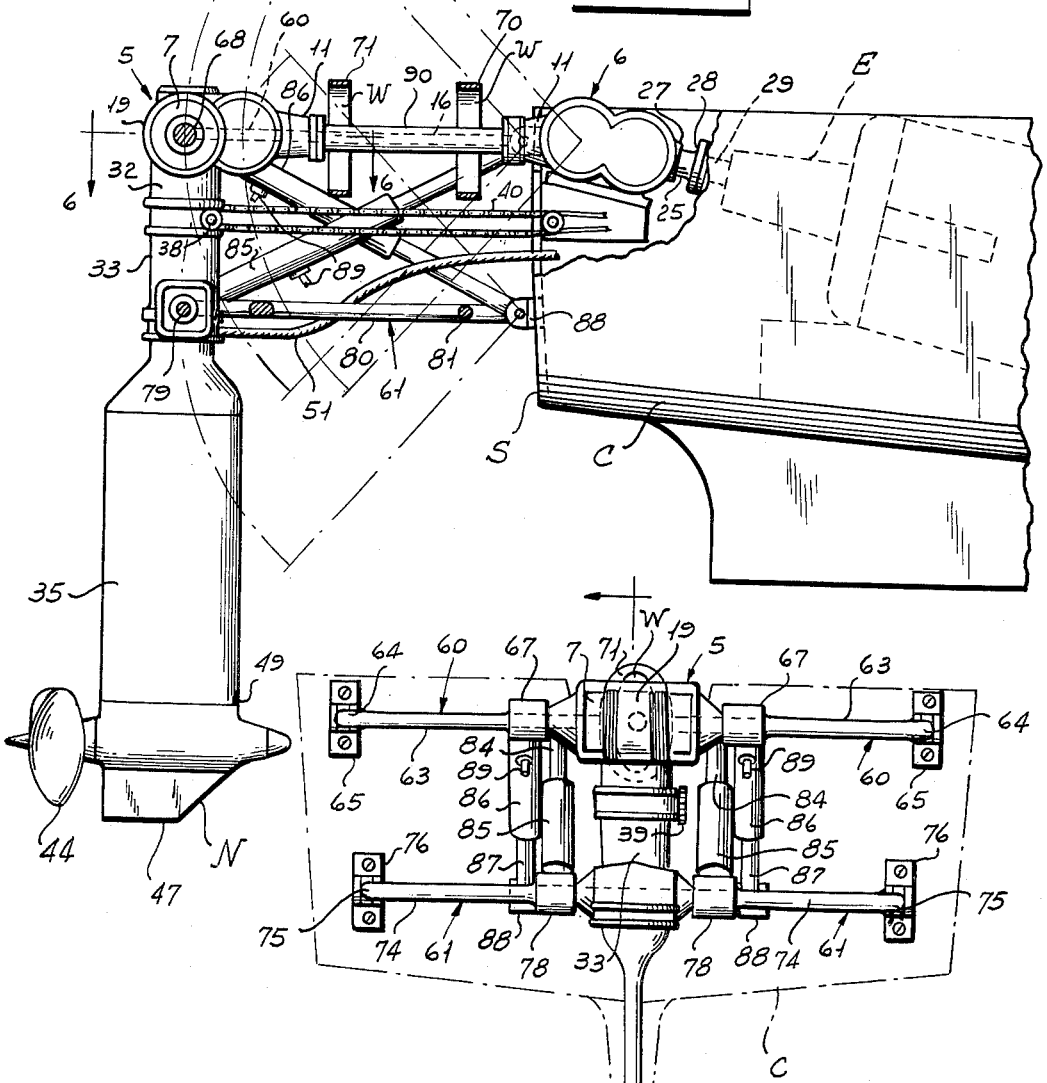

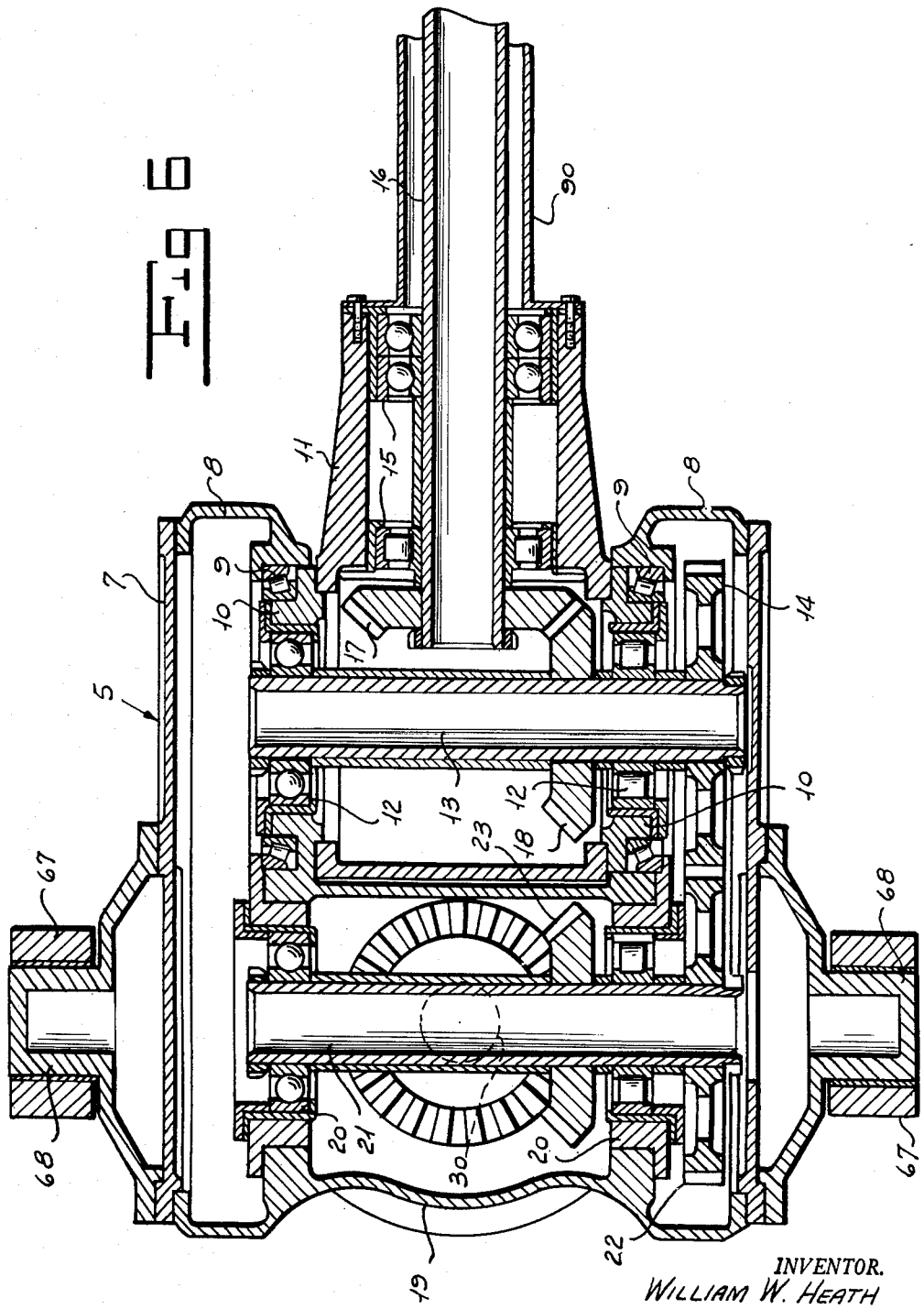

2,737,920

DRIVE FOR DEPTH REGULATED PROPELLER MOUNTING

William W. Heath, East Paterson, N. J., assignor to Watson-Flagg Machine Company, a corporation of New Jersey Application May 11, 1953, Serial No. 354,221

10 Claims. (Cl. 115—41)

My invention relates to drives and more particularly to flexible drives utilizable in conjunction with motor boats, landing craft and the like.

One of the objects of my invention is to provide flexible drive mechanism for outwardly mounting the propeller unit of a boat or landing craft in connected relation with the power unit within the craft for driving the propeller and which mechanism is operable in a manner to permit lowering and raising of the propeller into and out of the water together with means for steering the craft.

Another object of my invention is to provide drive mechanism for transmitting power from a power unit to a receiving unit and which mechanism is operable to shift the receiving unit from one position to another in parallel planes and relative to the power unit.

A further object of my invention is to provide drive mechanism of the foregoing described character which is equipped with manually controlled means for operating the mechanism to effect shifting of the receiving unit from one position to another in parallel planes and relative to the power unit.

An important object of my invention is to provide drive mechanism of the foregoing described character which is simple in construction, durable in use, efficient in operation, economical in manufacture and lends itself to ready installation.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a perspective view of my invention as connected to the stern of a landing craft.

Figure 2 is a top plan view thereof.

Figure 3 is a side elevation of my invention, partly in section, and illustrating the same as attached to the stern of a landing craft and in coupled relation with the power unit of the craft.

Figure 4 is a rear elevation of the invention.

Figure 6 is a detail sectional view taken on the line 6—6 of Figure 3.

Figure 5:
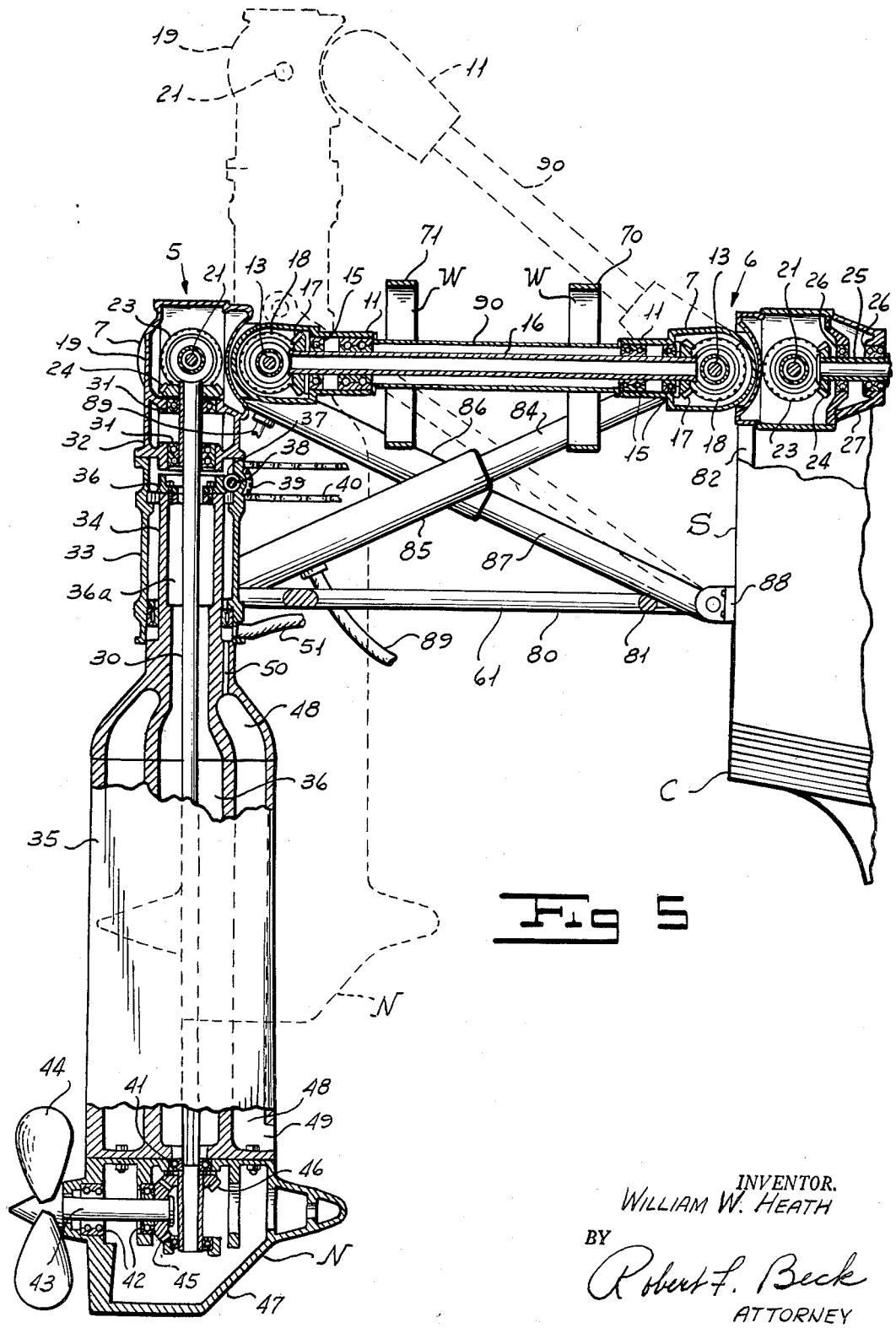
Figure 5 is a sectional view taken on the line 5—5 of Figure 4.

In the embodiment of my invention disclosed herein, I provide mechanism for establishing a driving connection between the power unit or engine of a boat, for instance, a landing craft, and an outboard rudder and propeller assembly comprising a propeller and which mechanism is operable in a manner to effect shifting of the propeller into and out of the water in various parallel positions.

In practicing my invention, as illustrated in the drawings, I provide a pair of hinge devices or gear hinges 5 and 6, respectively, each of which comprises a substantially U-shaped or bifurcal housing 7. The hollow bifurcations 8 of the housing 7 are equipped with bearings 9 disposed in their confronting walls and in which bearings 9 are journaled trunnions 10 fixed to the inner end section of a bearing casing 11 disposed between the bifurcations 8 for pivoting movement relative to the housing 7.

The trunnions 10 are of a hollow construction and have incorporated therein suitable bearings 12 in which are journaled the ends of a hollow countershaft 13 extending transversely through the casing, one end of the countershaft 13 having fixed thereto a spur gear 14 disposed within the proximous bifurcation 8. The casing 11 is provided with an outer section, disposed outwardly of the housing, having incorporated therein suitable bearings 15 in which is journaled one end of a hollow power transmitting shaft 16 equipped with a driving bevel gear 17 disposed within the inner end section of the casing 11 and meshing with a similar gear 18 fixed to the countershaft 13, whereby, the gears 14, 17 and 18 are connected for unitary operation as hereinafter more fully disclosed.

The housing 7 is formed with a head section 19 intermediate the bifurcations 8 and has mounted in the walls therebetween bearings 20 in which are journaled the ends of a hollow jack shaft 21 extending transversely through the head section and having fixed to one end thereof a spur gear 22 meshing with the spur gear 14 and disposed within the same bifurcation 8 therewith. The jack shaft 21 has fixed thereon, within the section 19, a bevel gear 23 meshing with a similar driven bevel gear 24.

In the instance of the device 6, the gear 24 is fixed to the inner end of a driving or power shaft 25 journaled within suitable bearings 26 carried within an extended portion 27 of the housing. The opposite or outer end of the shaft 25 is connected, by means of a coupling 28, to the drive shaft 29 of a power unit, for instance, a gasoline engine E, disposed within a boat or landing craft C.

Within the device 5, the gear 24 is fixed to the upper end of a substantially vertical driven shaft 30 disposed within a rudder and propeller assembly and in which shaft 30 is journaled, at its upper end section, in suitable bearings 31 encased within a depending portion 32 of the housing 7. The lower end of the portion 32 has fixed thereto the upper end of a sleeve 33 in which is rotatably mounted the upper end portion 34 of the rudder or fin 35 of the assembly and which has a central bore through which the shaft 30 extends. The portion 34 has fixed thereto a gear 36 meshing with a pinion 37 mounted on a shaft 38 journaled in the sleeve 33. The shaft 38 is rotated by a sprocket 39 fixed thereto and about which sprocket is trained a chain 40. The chain 40 extends into the landing craft C and is adapted to be operated, in any suitable manner, for effecting rotation of the shaft 38 whereby the rudder 35 pivots relative to the sleeve 33 for steering the craft.

The lower end of the rudder 35 has secured thereto a nacelle N for movement therewith and which nacelle is provided with suitable bearing 41 through which the lower end of the shaft 30 is journaled. The nacelle is also provided with bearings 42 through which is journaled a propeller shaft 43 equipped on its outer end with a propeller 44. The inner end of the propeller shaft 43 has fixed thereto a bevel gear 45 meshing with a similar gear 46 fixed to the shaft 30 whereby, upon rotation of the shaft 30, the propeller 44 is driven to propel the craft C through the water.

The lower end of the nacelle N is formed with an auxiliary depending fin 47 cooperating with the rudder 35 to effect said steering of the craft. The rudder 35 constitutes a casing through which the shaft 30 extends and is provided with a chamber 48 circumjacent the bore 36a. The lower end of the chamber 48 communicates with a water inlet opening 49 formed in the leading edge face of the rudder in proximity to the nacelle. The upper end of the chamber, through the medium of a passage 50, communicates with a hose 51 leading to the engine E, whereby the latter is supplied with cooling water introduced thereto through the opening 49 during forward movement of the craft.

I employ a somewhat parallelogrammic framework to effect raising and lowering of the rudder and propeller assembly out of and into the water and which framework comprises upper and lower frames or trusses 60 and 61, respectively. The upper truss 60 is fashioned with a pair of side members or struts 63 having coincident ends integrally connected with gudgeons 64 pivoted within clevis blocks 65 by means of pintels 66 and which blocks are secured, by suitable bolts or the like, to the stern S of the craft C and laterally with respect to the device 6. The opposite end of the struts 63 are integrally connected to bearing collars 67 in which are received pivots or trunnions 68 secured to the housing of the device 5. Extending between and connected to the gudgeons 64 are transverse stays 69 having their inner ends fixed to a closed yoke 70 while a similar yoke 71, disposed in proximity to the device 5, has connected thereto stays 72 leading to the gudgeons 61. The stays 72, adjacent the yoke 71, are integrally connected to a pair of braces 73 which extend between and are connected to the yoke 70 and the collars 67, as clearly illustrated in the drawings. Each of the yokes 70 and 71 is formed with a substantially vertically disposed elongated slot W through which the shaft 16 extends and which permits vertical movement of the shaft 16 relative to the truss 60 upon raising and lowering of the assembly.

The lower truss 61 is also provided with a pair of side members or struts 74 having coincident ends fixed to gudgeons 75 pivotally mounted within clevis blocks 76 by means of pintles 77 and which blocks are secured substantially subjacent the blocks 65 by suitable bolts or the like to the stern S. The opposite ends of the struts 74 are connected to bearing collars 78 rotatably carried on trunnions 79 fixed to and extending laterally from the sleeve 33. Also connected to the collars 78 are the ends of a pair of crossed integrally connected stays 80. The opposite ends of the stays 80 are secured to the gudgeons 75 while a transverse stay 81 is connected between the stays 80 in proximity to the gudgeons 75 as clearly illustrated in the drawings.

The stern S is formed with an opening 82 through which the housing 7 of the device 6 extends, while laterally of the opening 82, there is mounted clevis blocks 83 in which are pivotally connected the outer ends of a pair of piston rods 84 or the like. The opposite ends of the rods 84 are connected to pistons disposed within cylinders 85 having ends, remote from the blocks 83, pivotally connected to the trunnions 79. The trunnions 68 have pivotally connected thereto the ends of similar cylinders 86 provided with pistons to which are secured rods 87 having their outer ends pivoted to similar blocks 88 subjacent the blocks 83 and out of vertical alignment with the latter to dispose the cylinders 86 outwardly of the cylinders 85.

The cylinders 85 and 86, their respective pistons and rods 84 and 87 constitute hydraulic means for raising and lowering the rudder and propeller assembly, suitable flexible connections, for instance, hoses 89 being connected to the cylinders and leading to an appropriate control unit within the craft. Upon manipulation of the control unit, the rods 87 may be caused to move out of the cylinders 86 and the rods 84 into the cylinders 85 with the result that the entire rudder and propeller assembly is shifted into a parallel raised position while at the same time relative movement of the gears 14 and 22 of the devices 5 and 6 serves to dispose the shaft 16 in raised position as illustrated in Figure 5 of the drawings. The control unit may be further manipulated to effect a reverse operation of the aforementioned components whereby a lowering of the rudder and propeller assembly may be obtained. It will be understood that the propeller may be continuously operated by the flow of power from the engine without interruption due to the raising and lowering of the assembly. In order to prevent relative displacement of the housings 7, for instance, due to rotation of the shaft 16, the casings 11 are connected together in fixed relation by means of a tie member or sleeve 90 through which the shaft 16 extends. The sleeve 90 also functions to lend rigidity to the structure against distortion or breakage.

From the foregoing, it will be apparent that I have provided extremely simple means for steering the landing craft and at the same time connecting its propeller to the engine in a manner to permit the propeller to be lowered or raised a desired distance into or out of the water without shifting with respect to the horizontality of its axis. Furthermore, the construction of the mechanism, for instance, the hollow shafts, etc., is such as to impart sufficient flexibility thereto to prevent rupture or breakage of any of the components during normal operation thereof while at the same time lending sufficient rigidity thereto to insure the efficient functioning thereof.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In a drive of the class described, a power shaft having a mounting, a pair of angularly related power transmitting shafts of fixed lengths, hinge means connecting said transmitting shafts together for unitary rotation and relative angular movement, similar hinge means connecting one of said transmitting shafts to said power shaft for driving said transmitting shafts, a power receiving unit spaced from said first mentioned means and having a driven member connected to and driven by said other transmitting shaft, connecting means securing said unit to said first mentioned hinge means, guide means pivotally connecting said other transmitting shaft to said mounting and coacting with both of said hinge means to effect shifting of said other transmitting shaft into a substantially parallel plane upon relative angular movement of said transmitting shafts.

2. The structure as set forth and defined in claim 1 including, each of said means comprising a pair of relatively movable housing sections, a pair of parallel shafts disposed in said sections with one of said shafts constituting a pivot for said sections, a pair of meshing gears fixed to said shafts, respectively, for transmitting power therebetween, spaced bevel gears fixed to said shafts, respectively, drive and driven bevel gears disposed within said sections and in mesh with said first mentioned bevel gears, respectively, said driven bevel gear of said first mentioned means being fixed to said other transmitting shaft and said driving bevel gear of said second mentioned means being fixed to said power shaft whereby power from said power shaft drives said driven member through said gears.

3. In combination with a mounting having an engine equipped with a power shaft, an outboard propeller drive comprising a pair of angularly related power transmitting shafts of fixed lengths, hinge means connecting said transmitting shafts together for unitary rotation and relative angular movement, similar hinge means connecting one of said transmitting shafts to said power shaft for driving said transmitting shafts, and a power receiving unit spaced from said first mentioned means and having a driven member connected to and driven by said other transmitting shaft, housing means enclosing said other transmitting shaft and connecting said unit to said first mentioned hinge means, and a framework pivotly connected to said mounting and said drive and coacting with both of said hinge means to effect shifting of said other transmitting shaft into a substantially parallel plane upon relative angular movement of said transmitting shafts.

4. The structure as set forth and defined in claim 3 including, each of said means comprising a pair of relatively movable housing sections, a pair of countershafts disposed in said sections with one of said countershafts constituting a pivot for said sections, a pair of meshing gears fixed to said countershafts, respectively, for transmitting power therebetween, spaced bevel gears fixed to said countershafts, respectively, drive and driven bevel gears disposed within said sections and in mesh with said first mentioned bevel gears, respectively, said driven bevel gear of said first mentioned means being fixed to said other transmitting shaft and said driving bevel gear of said second mentioned means being fixed to said power shaft whereby said power shaft drives said driven member through said gears.

5. In combination with a boat equipped with a power shaft, an outboard motor drive for said boat comprising a pair of angularly related power transmitting shafts with one of said shafts being disposed in substantial verticality, hinge means connecting said one transmitting shaft to the other transmitting shaft for unitary rotation and relative angular movement, similar hinge means connecting said other transmitting shaft to said power shaft for driving said transmitting shafts, tie means connected to both of said hinge means and extending therebetween to preclude relative rotation of said first and second mentioned hinge means by rotation of said other transmitting shaft, a housing constituting a rudder having an upper end pivoted to said first mentioned hinge means and provided with a bore through which said one transmitting shaft extends, manually controlled mechanism connected to said rudder for pivoting the latter relative to said one transmitting shaft whereby to steer said boat, a propeller unit secured to the lower end of said rudder and having a propeller shaft connected to and driven by said one transmitting shaft, and a framework pivotly connected to said boat and provided with trusses pivoted to said drive and coacting with both of said hinge means to effect shifting of said one transmitting shaft from susbtantially one vertical parallel plane to another to thus raise and lower said propeller unit out of and into the water upon relative angular movement of said transmitting shafts, and manually controlled hydraulic means pivotly connected to said boat and to said drive superjacent said rudder for moving said trusses to effect said shifting.

6. In a drive of the class described, a power shaft having a mounting, a pair of angularly related power transmitting shafts of fixed lengths, hinge means connecting said transmitting shafts together for unitary rotation and relative angular movement, similar hinge means connecting one of said transmitting shafts to said power shaft for driving said transmitting shafts, a power receiving unit spaced from said first mentioned means and having a driven member connected to and driven by the other of said transmitting shafts, connecting means securing said unit to said first mentioned hinge means, a first rigid framework pivotally connected to said mounting and to said connecting means, a second rigid framework substantially parallel to said first framework and being pivotally connected to said mounting and said first hinge means, and means for pivoting said frameworks to thereby shift said other transmitting shaft into different planes substantially parallel to each other.

7. In combination with a boat equipped with a power shaft, an outboard motor drive for said boat comprising a first power transmitting shaft of fixed length, first hinge means connecting said first power transmitting shaft to said power shaft for unitary rotation and relative angular movement, a second power transmitting shaft of fixed length extending downwardly from said first power transmitting shaft, second hinge means connecting said power transmitting shafts together for unitary rotation and relative angular movement, a propeller unit secured to said second hinge means and having a propeller shaft connected to and driven by said second power transmitting shaft, a framework pivotally connected to said boat for movement about a horizontal axis and pivotally connected to said drive and coacting with both of said hinge means to effect shifting of said second transmitting shaft from one plane to another substantially parallel plane to raise or lower said propeller unit, and power means pivotally connected to said boat and to said drive for raising and lowering said propeller unit.

8. In combination with a boat equipped with a power shaft, an outboard motor drive for said boat comprising a first power transmitting shaft of fixed length, first hinge means connecting said first power transmitting shaft to said power shaft for unitary rotation and relative angular movement, a second power transmitting shaft of fixed length extending downwardly from said first power transmitting shaft, second hinge means connecting said power transmitting shafts together for unitary rotation and relative angular movement, a tube surrounding said first power transmitting shaft and being connected at its ends to both of said hinge means to prevent rotation of said second hinge means relative to said first hinge means, a propeller unit secured to said second hinge means and having a propeller shaft connected to and driven by said second power transmitting shaft, a framework pivotally connected to said boat for movement about a horizontal axis and pivotally connected to said drive and coacting with both of said hinge means to effect shifting of said second transmitting shaft from one plane to another substantially parallel plane to raise or lower said propeller unit, and power means pivotally connected to said boat and to said drive for raising and lowering said propeller unit.

9. In combination with a boat equipped with a power shaft, an outboard motor drive for said boat comprising a pair of angularly related power transmitting shafts with one of said shafts being disposed in substantial verticality, hinge means connecting said one transmitting shaft to the other transmitting shaft for unitary rotation and relative angular movement, similar hinge means connecting said other transmitting shaft to said power shaft for driving said transmitting shafts, a housing constituting a rudder having an upper end pivoted to said first mentioned hinge means and provided with a bore through which said one transmitting shaft extends, manually controlled mechanism connected to said rudder for pivoting the latter relative to said one transmitting shaft whereby to steer said boat, a propeller unit secured to the lower end of said rudder and having a propeller shaft connected to and driven by said one transmitting shaft, and a framework pivotally connected to said boat and to said drive and coacting with both of said hinge means to effect shifting of said one transmitting shaft from one substantially vertical plane to another substantially vertical plane to thus raise and lower said propeller unit out of and into the water upon relative movement of said transmitting shafts, and manually controlled means pivotally connected to said boat and to said drive superjacent said rudder for moving said framework to effect said shifting.

10. In a landing craft or the like equipped with a power shaft, an outboard drive including a propeller operating shaft disposed in a definite operating plane within the water, a driving assembly connected to said operating shaft and to the power shaft of said craft and being operable for raising and lowering said operating shaft out of and into the water, and guide means pivotally connecting said assembly to said craft and guiding said operating shaft into planes paralleling said operating plane during said raising and lowering.

References Cited in the file of this patent

UNITED STATES PATENTS

| Number | Name | Date |
|---|---|---|
| 553,124 | Meister | Jan. 14, 1896 |
| 1,385,130 | Hooke | July 19, 1921 |
| 1,515,441 | Peterson | Nov. 11, 1924 |
| 1,840,948 | Harvey | Jan. 12, 1932 |
| 2,333,292 | Brooks | Nov. 2, 1943 |
| 2,458,813 | Wanzer | Jan. 11, 1949 |
| 2,557,637 | Danuser | June 19, 1951 |
| 2,581,535 | Jackson | Jan. 8, 1952 |
| 2,643,837 | Rivers | June 30, 1953 |